(12) United States Patent
Yu

(10) Patent No.: US 12,246,561 B2
(45) Date of Patent: Mar. 11, 2025

(54) WIRELESS TIRE PRESSURE DETECTOR AUTOMATIC FIND AND LOCATE SYSTEM AND OPERATION METHOD THEREOF

(71) Applicant: Chih-Wei Yu, Taipei (TW)

(72) Inventor: Chih-Wei Yu, Taipei (TW)

(73) Assignee: SYSGRATION LTD.

( * ) Notice: Subject to any disclaimer, the term of this patent is extended or adjusted under 35 U.S.C. 154(b) by 250 days.

(21) Appl. No.: 18/108,011

(22) Filed: Feb. 10, 2023

(65) Prior Publication Data

US 2023/0256781 A1 Aug. 17, 2023

(30) Foreign Application Priority Data

Feb. 15, 2022 (TW) .................................. 111105496

(51) Int. Cl.
*B60C 23/04* (2006.01)
(52) U.S. Cl.
CPC .................... *B60C 23/0483* (2013.01)
(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/0462; B60C 23/20; B60C 23/041; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/0452; B60C 23/0498; B60C 23/02; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/003; B60C 23/00318; B60C 23/0403;
(Continued)

(56) References Cited

U.S. PATENT DOCUMENTS 7,010,968 B2 * 3/2006 Stewart ............... B60C 23/0444
73/146
7,382,239 B2 * 6/2008 Song ................... B60C 23/0444
340/447
(Continued)

FOREIGN PATENT DOCUMENTS

DE 102023102572 A1 * 8/2023 ......... B60C 23/0416
KR 20140099490 A * 8/2014
TW 201414624 A * 4/2014

*Primary Examiner* — Andre J Allen

(57) ABSTRACT

A wireless tire pressure detector automatic find and locate system and the operation method thereof are provided. The wireless tire pressure detector automatic find and locate system includes a plurality of wireless tire pressure detectors and a wireless host. The wireless host and each wireless tire pressure detector are wirelessly paired and connected through a wireless system, and a first wireless tire pressure detector is designated. The wireless host and the first wireless tire pressure detector detect signal data between the first wireless tire pressure detector and other wireless tire pressure detectors, and the first wireless tire pressure detector transmits the data to the wireless host for analyzing and positioning to localize each wireless tire pressure detector.

5 Claims, 3 Drawing Sheets

(58) Field of Classification Search
CPC ... B60C 23/0472; B60C 23/066; B60C 23/00; B60C 23/00372; B60C 23/0406; B60C 29/02; B60C 23/006; B60C 11/00; B60C 23/0454; B60C 23/044; B60C 23/0455; B60C 23/008; B60C 23/0483; B60C 25/002; B60C 23/0461; B60C 23/0474; B60C 23/0489; B60C 23/0491; B60C 29/064; B60C 23/0415; B60C 23/00363; B60C 23/0459; B60C 23/0471; B60C 23/0481; B60C 23/0476; B60C 11/0318; B60C 23/0477; B60C 2200/02; B60C 23/002; B60C 23/0437; B60C 2019/005; B60C 23/042; B60C 23/0405; B60C 23/0422; B60C 23/0423; B60C 23/0466; B60C 13/001; B60C 29/06; B60C 23/0447; B60C 25/132; B60C 23/0427; B60C 23/0449; B60C 19/18; B60C 25/00; B60C 23/065; B60C 23/0484; B60C 23/0486; B60C 19/003; B60C 13/00; B60C 23/00336; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/04; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066; G01M 1/08; G01M 1/22; G01M 13/027; G01M 5/0033; G01M 1/00; G01M 15/044; G01M 17/00; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06

USPC .................................................. 73/146–146.8
See application file for complete search history.

(56) References Cited

U.S. PATENT DOCUMENTS

| | | | |
|---|---|---|---|
| 7,506,540 B1* | 3/2009 | Job | B60C 23/0416 340/447 |
| 9,463,673 B2* | 10/2016 | Huang | B60C 23/20 |
| 2009/0184814 A1* | 7/2009 | Lee | B60C 23/008 340/447 |
| 2023/0030430 A1* | 2/2023 | Yu | H01Q 1/2241 |
| 2023/0234405 A1* | 7/2023 | Yu | B60C 23/0416 340/442 |

* cited by examiner

WIRELESS TIRE PRESSURE DETECTOR AUTOMATIC FIND AND LOCATE SYSTEM AND OPERATION METHOD THEREOF

FIELD OF THE DISCLOSURE

The present disclosure relates to a wireless tire pressure detector automatic find and locate system and operation method thereof.

BACKGROUND OF THE DISCLOSURE

In traffic accidents, accidents caused by tire failure account for a very high proportion, especially when the vehicle is running at high speed, a sudden tire failure will lead to serious accident results. Therefore, checking the tire pressure of the vehicle is an important issue that cannot be ignored before driving on the road.

With the needs during driving and the advancement of technology, products that are equipped with wireless tire pressure detection have gradually developed. This type of tire pressure detector can detect tire information on the tire in real-time. Through wireless transmission, the host computer can receive and analyze the tire information, and then promptly notify the condition of the tire to the driver, so that the driver can easily be aware of the condition of the tire and maintain safety during driving.

In the market related to the tire pressure detection system, the industry usually adopts a programming method for the host computer to distinguish the tire pressure detectors on different wheels. Specifically, the serial number is programmed on the host computer, so that the host can identify the tire pressure detector represented by each serial number and the corresponding wheel position. This method has a good effect on stability.

However, even though this method is simple and effective, when it comes to replacing the tire pressure detector or wrong programmed information, the solution is re-programming in the factory, which is extremely troublesome. Therefore, when the tire pressure detector is damaged and needs to be replaced, the drivers may ignore or refuse to replace it, which increases the risk of driving on the road.

In the conventional art, wireless tire pressure detectors usually only had a single function of transmitting data out. As disclosed in U.S. Pat. No. 9,463,673 B2, which provides a method using a wireless tire pressure detector to detect the tire acceleration to measure the angle of the wheel, and the data is transmitted back to the host site for calculation.

Further, as disclosed in U.S. Pat. No. 7,010,968 B2, which provides a method using the wireless tire pressure detector to detect the tire acceleration to determine the left wheel and the right wheel, and the data is transmitted back to the host, and detect the signal strength information, so that the host can locate the position of the tire pressure detector on wheel.

However, in these methods, the host computer only analyzes the data detected by the wireless tire pressure detectors. If there is noise interference when the vehicle is moving, it will cause a signal error problem. The error problem leads the host computer unable to process the determination, and therefore causes errors in positioning results or prolong positioning time.

Moreover, if the angle or signal direction positioning is performed solely by the host computer, for a large truck with parallel tires, it is impossible to clearly distinguish the inner, outer, front, and rear positions of the tires.

Therefore, there is a need to optimize and improve the above-mentioned situations, so as to effectively improve the user's willingness and convenience to replace tire pressure detectors, and also reduce the trouble caused by returning to the factory for re-programming and the labor cost of replacing tire pressure detectors.

SUMMARY OF THE DISCLOSURE

The present disclosure provides a wireless tire pressure detector automatic find and locate system, including a plurality of wireless tire pressure detectors and a wireless host. In detail, the plurality of wireless tire pressure detectors are disposed on different wheels, each wireless tire pressure detector includes a monitoring module and a main control module. The monitoring module is used for monitoring and transmitting tire data to the main control module, and the main control module includes functions of transmitting data, receiving data, searching for other wireless devices, and sensing signal source strength.

Further, the wireless host is disposed on a vehicle and includes a control module and a data transceiver module. The control module includes functions of searching for other wireless devices, sensing signal source strength and computational analysis data. And the data transceiver module includes functions for transmitting data and receiving data.

When the wireless host and the plurality of wireless tire pressure detectors process wireless pairing connection through a wireless system, the wireless host designates a first wireless tire pressure detector of the plurality of wireless tire pressure detectors, the wireless host and the first wireless tire pressure detector collect the signal strength and/or phase angle between the first wireless tire pressure detector and other wireless tire pressure detectors through the control module and the main control module respectively.

Furthermore, the first wireless tire pressure detector transmits the data to the data transceiver module of the wireless host and the data transceiver module forwards the data to the control module; wherein the control module integrates and compares the positioning results of the wireless host and the positioning results collected by the first wireless tire pressure detector, and precisely localizes of each wireless tire pressure detector.

The present disclosure further provides an operation method of a wireless tire pressure detector automatic find and locate system, including connecting and designating step, collecting data step, transmitting and forwarding step and analyzing and positioning step. The detailed descriptions are as follows:

connecting and designating step: wireless pairing and connecting the wireless host and each wireless tire pressure detector through a wireless system, and designating a first wireless tire pressure detector;

collecting data step: after the connecting and designating step, the wireless host and the first wireless tire pressure detector are connected through the wireless system, the wireless host and the first wireless tire pressure detector detect and collect the signal strength and/or the phase angle between the first wireless tire pressure detector and other wireless tire pressure detectors through the control module and the main control module respectively;

transmitting and forwarding step: after the collecting data step, the first wireless tire pressure detector transmits the data through the main control module to a data transceiver module of the wireless host and the data is forwarded to the control module; and analyzing and positioning step: after the transmitting and forwarding step, the control module analyses and calculates the received data, and therefore localizes each wireless tire pressure detector.

The present disclosure provides a wireless tire pressure detector automatic find and locate system and an operation method thereof. Through the wireless pairing of the wireless host and the plurality of wireless tire pressure detectors, and designating the first wireless tire pressure detector, the wireless host and the first wireless tire pressure detector can obtain the signal strength and/or the phase angle between the first wireless tire pressure detector and other wireless tire pressure detectors. Afterward, the first wireless tire pressure detector transmits the obtained data to the wireless host for analyzing and positioning, so that the wireless host can localize each wireless tire pressure detector on the wheel.

There is no need to go back to the factory like the traditional programming method for re-programming the serial number whenever a tire pressure detector is replaced or added. Further, due to the double comparison system, if any of the wireless host or the first wireless tire pressure detector is interfered or data losing, the data for positioning can still be obtained by the other. This double verification method not only increases the positioning accuracy, but also reduces the possibility of positioning losses and errors.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
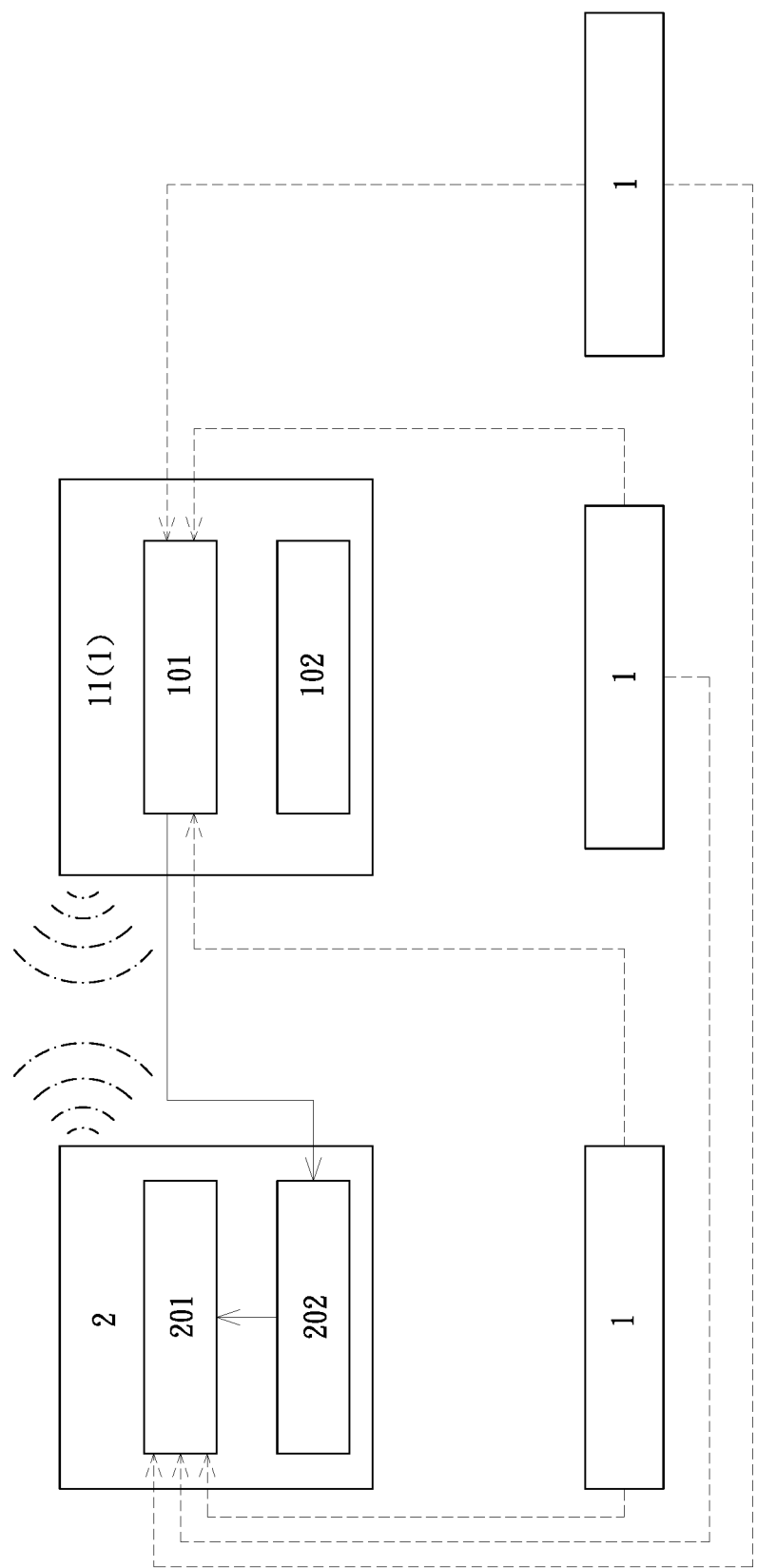
FIG. 1 is a framework view of the system of the present disclosure.

The present disclosure is more particularly described in the drawings and following examples that are intended as illustrative only. It is to be understood that these embodiments are exemplary implementations and are not to be construed as limiting the scope of the present disclosure in any way. Further modifications to the disclosed embodiments, as well as other embodiments, are also included within the scope of the appended claims. Regarding the drawings, the relative proportions and ratios of elements in the drawings may be exaggerated or diminished in size for the sake of clarity and convenience. Such arbitrary proportions are only illustrative and not limiting to the scale.

Figure 2:
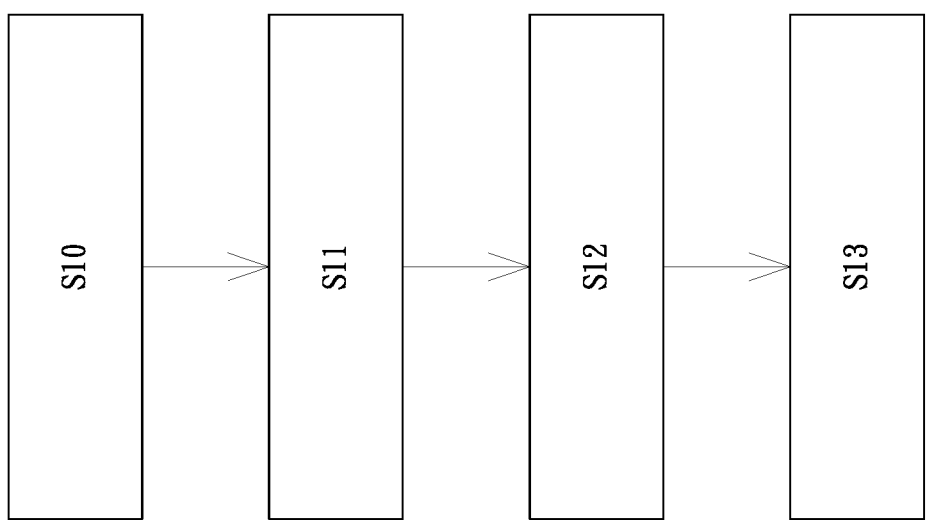
FIG. 2 is a flowchart of the method of the present disclosure.
Figure 3:
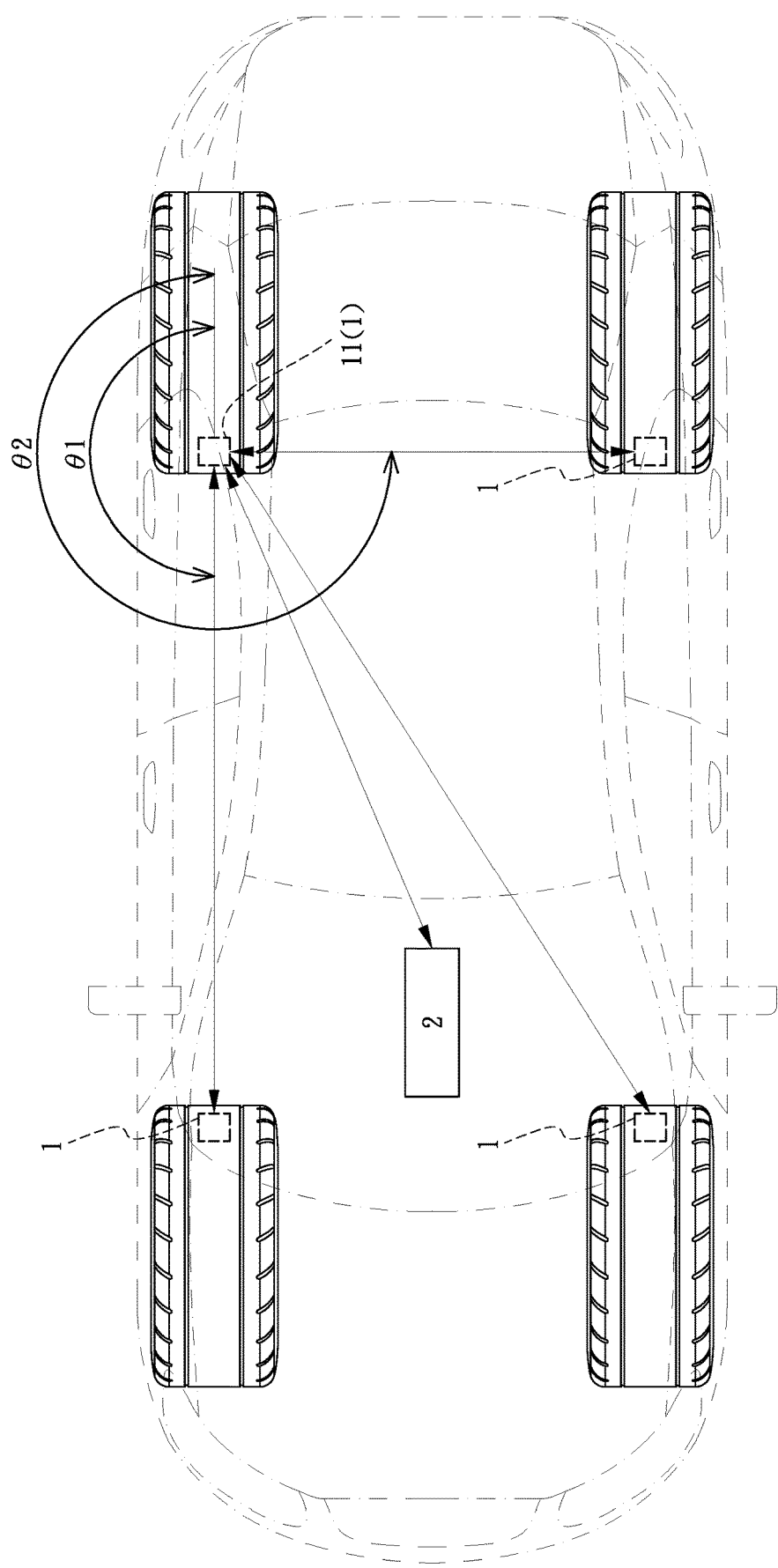
FIG. 3 is a schematic view of the system and method of the present disclosure in practice.

As shown in FIGS. 1 to 3, the present disclosure provides a wireless tire pressure detector automatic find and locate system, comprising a plurality of wireless tire pressure detectors 1 and a wireless host 2. The plurality of wireless tire pressure detectors 1 are disposed on different wheels, in which each of the plurality of wireless tire pressure detectors 1 includes a monitoring module 102 and a main control module 101. The monitoring module 102 is used for monitoring and transmitting tire data to the main control module 101, and the main control module 101 includes functions of transmitting data, receiving data, searching for other wireless devices and sensing signal source strength.

As shown in FIG. 1, the wireless host 2 is disposed on a vehicle and includes a control module 201 and a data transceiver module 202. In detail, the control module 201 includes functions of searching for other wireless devices, sensing signal source strength and computational analysis data. And the data transceiver module 202 includes functions for transmitting data and receiving data.

Further, as shown in FIGS. 1 to 3, the dotted line shows that each wireless tire pressure detector 1 transmits data to the wireless host 2, and the solid line shows that the path through which the data transmitted by each wireless tire pressure detector 1 is integrated and transmitted.

When the wireless host 2 and the plurality of wireless tire pressure detectors 1 process wireless pairing connection through a wireless system, the wireless host 2 designates a first wireless tire pressure detector 11 of the plurality of wireless tire pressure detectors 1, the wireless host 2 and the first wireless tire pressure detector 11 collect the signal strength and/or phase angle between the first wireless tire pressure detector and other wireless tire pressure detectors 1 through the control module 201 and the main control module 101 respectively.

Furthermore, the first wireless tire pressure detector 11 transmits the data to the data transceiver module 202 of the wireless host 2 through the main control module 101, and the data is forwarded to the control module 201. The control module 201 integrates and compares the positioning results of the wireless host 2 and the positioning results collected by the first wireless tire pressure detector 1, and precisely localizes each wireless tire pressure detector 1.

In practice, as shown in FIGS. 1-3, each wireless tire pressure detector 1 is disposed on the wheel and paired with the wireless host 2 installed in the vehicle through a wireless system. In operating, the wireless host 2 designates a first wireless tire pressure detector 11, the wireless host 2 and the first wireless tire pressure detector 11 detect and collect the signal strength and/or the phase angle between the first wireless tire pressure detector and other wireless tire pressure detectors 1, the first wireless tire pressure detector 11 transmits the obtained data to the wireless host 2, and the wireless host analyses and calculates the received data, and localizes each wireless tire pressure detector 1, more particularly locates each wireless tire pressure detector on which wheel of the vehicle.

Moreover, as shown in FIG. 3, in the embodiment, the main way for the first wireless tire pressure detector 11 to detect the signal strength between the first wireless tire pressure detector and other wireless tire pressure detectors 1 is according to the distance. For example, if the first wireless tire pressure detector 11 is set to be the right rear wheel, then the first wireless tire pressure detector 11 will determine that the strongest signal is the left rear wheel and the second strong signal for the right front wheel and the last strong for the left front wheel.

In addition, in the embodiment, the first wireless tire pressure detector 11 detects the phase angle between the first wireless tire pressure detector and other wireless tire pressure detectors 1 can be shown in FIG. 3. If the first wireless tire pressure detector 11 is set as the right rear wheel, then among the other wireless tire pressure detectors 1, the angle $\theta 1$ with the smallest angle is the right front wheel, the angle $\theta 2$ with the largest angle is the left rear wheel, and the angle is between the two is the left front wheel.

Furthermore, the wireless tire pressure detector automatic find and locate system includes a central control display for displaying and adjusting the data analyzed by the control module 201, so that the applicability of the active search and positioning system of the wireless tire pressure detector of the present disclosure can be increased.

Moreover, the wireless system of the present disclosure includes Bluetooth, ZigBee, LoRa (Long Range), Sigfox, NB-IoT (Narrowband Internet of Things), etc.

The above-mentioned first wireless tire pressure detector 11 can be any one of the wireless tire pressure detectors 1.

The detailed descriptions of the exemplary embodiments of the present disclosure are as follows. As shown in FIG. 2, the present disclosure provides an operation method, including connecting and designating step S10, collecting data step S11, transmitting and forwarding step S12 and analyzing and positioning step S13. The detailed descriptions are as follows:

connecting and designating step S10: wireless pairing and connecting the wireless host 2 and each wireless tire pressure detector 1 through a wireless system, and designating a first wireless tire pressure detector 11;

collecting data step S11: after the connecting and designating step S10, the wireless host 2 and the first wireless tire pressure detector 11 are connected through the wireless system, and the wireless host 2 and the first wireless tire pressure detector 11 detect and collect the signal strength and/or the phase angle between the first wireless tire pressure detector and other wireless tire pressure detectors 1, and transmit the data to a control module 201 and a main control module 101;

transmitting and forwarding step S12: after the collecting data step S11, the first wireless tire pressure detector 11 transmits the data through the main control module 101 to a data transceiver module 202 of the wireless host 2 and the data is forwarded to the control module 201; and analyzing and positioning step S13: after the transmitting and forwarding step S12, the control module 201 analyses and calculates the received data, and therefore localizes each of the wireless tire pressure detectors.

Moreover, in the operation method of the wireless tire pressure detector automatic find and locate system, the wireless system includes Bluetooth, ZigBee, LoRa (Long Range), Sigfox, or NB-IoT and etc.

What is claimed is:

1. A wireless tire pressure detector automatic find and locate system, comprising:

a plurality of wireless tire pressure detectors, disposed on different wheels of a vehicle; wherein each of the plurality of wireless tire pressure detectors includes a monitoring module and a main control module, the monitoring module is used for monitoring and transmitting tire data to the main control module, and the main control module includes functions of transmitting data, receiving data, searching for other wireless devices and sensing signal source strength; and a wireless host, disposed in the vehicle and including a control module and a data transceiver module; wherein, the control module includes functions of searching for other wireless devices, sensing signal source strength and computational analysis data;

wherein when the wireless host and the plurality of wireless tire pressure detectors process wireless pairing connection through a wireless system, the wireless host designates a first wireless tire pressure detector, the wireless host and the first wireless tire pressure detector collect the signal strength and/or phase angle between the first wireless tire pressure detector and other wireless tire pressure detectors through the control module and the main control module respectively;

wherein the first wireless tire pressure detector transmits the data to the data transceiver module and the data transceiver module forwards the data to the control module, and the control module integrates and compares the data of the wireless host and the data collected by the first wireless tire pressure detector, and localizes each wireless tire pressure detector.

2. The wireless tire pressure detector automatic find and locate system according to claim 1, including a central control display for displaying and adjusting the data analyzed by the control module.

3. The wireless tire pressure detector automatic find and locate system according to claim 1, wherein the wireless system includes Bluetooth, ZigBee, LoRa (Long Range), Sigfox, and NB-IoT (Narrowband Internet of Things).

4. An operation method of a wireless tire pressure detector automatic find and locate system, comprising:

connecting and designating step: wireless pairing and connecting the wireless host and each of the plurality of wireless tire pressure detectors through a wireless system, and designating a first wireless tire pressure detector of the plurality of wireless tire pressure detectors;

collecting data step: the wireless host and the first wireless tire pressure detector are connected through the wireless system, and detect and collect the signal strength and/or the phase angle between the first wireless tire pressure detector and other wireless tire pressure detectors through the control module and the main control module respectively;

transmitting and forwarding step: the first wireless tire pressure detector transmits the data through the main control module to a data transceiver module and the data transceiver module forwards the data to the control module; and analyzing and positioning step: the control module analyses and calculates the data of the wireless host and the data received from the data transceiver module, and localizes each wireless tire pressure detector.

5. The operation method of a wireless tire pressure detector automatic find and locate system according to claim 4, wherein the wireless system includes Bluetooth, ZigBee, LoRa (Long Range), Sigfox, and NB-IoT.

* * * * *